(12) United States Patent
Hantke et al.

(10) Patent No.: US 10,816,784 B1
(45) Date of Patent: Oct. 27, 2020

(54) INTERFEROMETRIC SCATTERING MICROSCOPY METHODS AND SYSTEMS

(71) Applicants: Refeyn Limited, Oxford (GB); Oxford University Innovation Limited, Oxford (GB)

(72) Inventors: Max Hantke, Oxford (GB); Gavin Young, Oxford (GB)

(73) Assignee: Refeyn LTD, Oxford (GB)

( * ) Notice: Subject to any disclaimer, the term of this patent is extended or adjusted under 35 U.S.C. 154(b) by 0 days.

(21) Appl. No.: 16/446,089

(22) Filed: Jun. 19, 2019

(51) Int. Cl.
*G02B 21/00* (2006.01)
*G02B 21/36* (2006.01)
*G01N 21/47* (2006.01)
*G01N 15/02* (2006.01)

(52) U.S. Cl.
CPC ..... *G02B 21/0056* (2013.01); *G01N 15/0211* (2013.01); *G01N 21/4795* (2013.01); *G02B 21/361* (2013.01)

(58) Field of Classification Search
CPC .......... G02B 21/0056; G01N 15/0211; G01N 15/1429
See application file for complete search history.

(56) References Cited

U.S. PATENT DOCUMENTS

| | | | | |
|---|---|---|---|---|
| 2011/0043607 | A1* | 2/2011 | Grier | G02B 21/361 348/40 |
| 2016/0266362 | A1* | 9/2016 | Kapanidis | G02B 7/28 |
| 2019/0004299 | A1* | 1/2019 | Kukura | G02B 21/0032 |
| 2019/0049354 | A1* | 2/2019 | Nadkarni | G01N 33/4833 |
| 2019/0195776 | A1* | 6/2019 | Liebel | G01N 15/1429 |
| 2019/0391375 | A1* | 12/2019 | Fahrbach | G02B 21/0032 |

\* cited by examiner

*Primary Examiner* — Michael P LaPage
(74) *Attorney, Agent, or Firm* — Vorys, Sater, Seymour and Pease LLP

(57) ABSTRACT

A method comprising the steps of: measuring a first series of interferometric scattering microscopy (iSCAT) signals and a second series of iSCAT signals of a sample on a sample holder, the sample comprising a particle dissolved in solution; deriving an illumination heterogeneity for the first series of iSCAT signals; deriving a reflectance profile for the first series of iSCAT signals based on the illumination heterogeneity and/or the second series of iSCAT signals; measuring a third series of iSCAT signals of the sample on the sample holder; and normalizing an interferometric contrast for the third series of iSCAT signals with the reflectance profile.

12 Claims, 3 Drawing Sheets

INTERFEROMETRIC SCATTERING MICROSCOPY METHODS AND SYSTEMS

BACKGROUND

The present disclosure relates to improving the resolution of interferometric scattering microscopy (iSCAT).

The work leading to this invention has received funding from the European Research Council under the European Union's Seventh Framework Programme (FP/2007-2013)/ERC grant agreement no 337757.

iSCAT measures interference contrast between (a) light reflected at the interface between a sample carrier and the sample solution (reference beam) and (b) light scattered by molecules in the sample solution attaching to the sample carrier (sample beam). The measured contrast can then be correlated to molecular weight.

iSCAT has materialized as a powerful approach to both single particle tracking with unique spatiotemporal resolution and label-free sensitivity down to the single molecule level. iSCAT provides information about the relative distribution of particles of different masses in solution without the requirement to add a label. An absolute or relative concentration of a particle provides valuable additional information about the sample that is being analyzed, particularly if the solution is a biological or environmental sample.

The applications of iSCAT have been limited by the requirement for custom-built microscopes, unconventional cameras, and complex sample illumination. However, improvements to the instrument have been developed, such that this technology has evolved into a powerful means for looking at single objects. An exemplary design of an iSCAT instrument is described in Cole et al ACS Photonics, 2017, 4 (2), pp 211-216 and Arroyo et al. Nat Protocols 2016, 617-633, each herein incorporated by reference. Further details about the instrument are provided in an earlier application by the present applicant, WO2018/011591, herein incorporated by reference.

SUMMARY OF THE INVENTION

The present disclosure relates to improving the resolution of iSCAT by accounting for heterogeneous reference beam characteristics. That is, the iSCAT measurements are corrected for not only heterogeneous illumination but also non-uniform reflectance.

According to the present invention there is provided a method comprising the steps of: measuring a first series of interferometric scattering microscopy (iSCAT) signals and a second series of iSCAT signals of a sample on a sample holder, the sample comprising a particle dissolved in solution; deriving an illumination heterogeneity for the first series of iSCAT signals; deriving a reflectance profile for the first series of iSCAT signals based on the illumination heterogeneity and/or the second series of iSCAT signals; measuring a third series of iSCAT signals of the sample on the sample holder; normalizing an interferometric contrast for the third series of iSCAT signals with the reflectance profile.

The solution in which the particle is dissolved may be any solution including organic solvents.

The steps set out in the method of the present invention do not necessarily have to be performed sequentially as listed. For example, it is possible to take an iterative approach to make both derivations from a single series of iSCAT signals.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
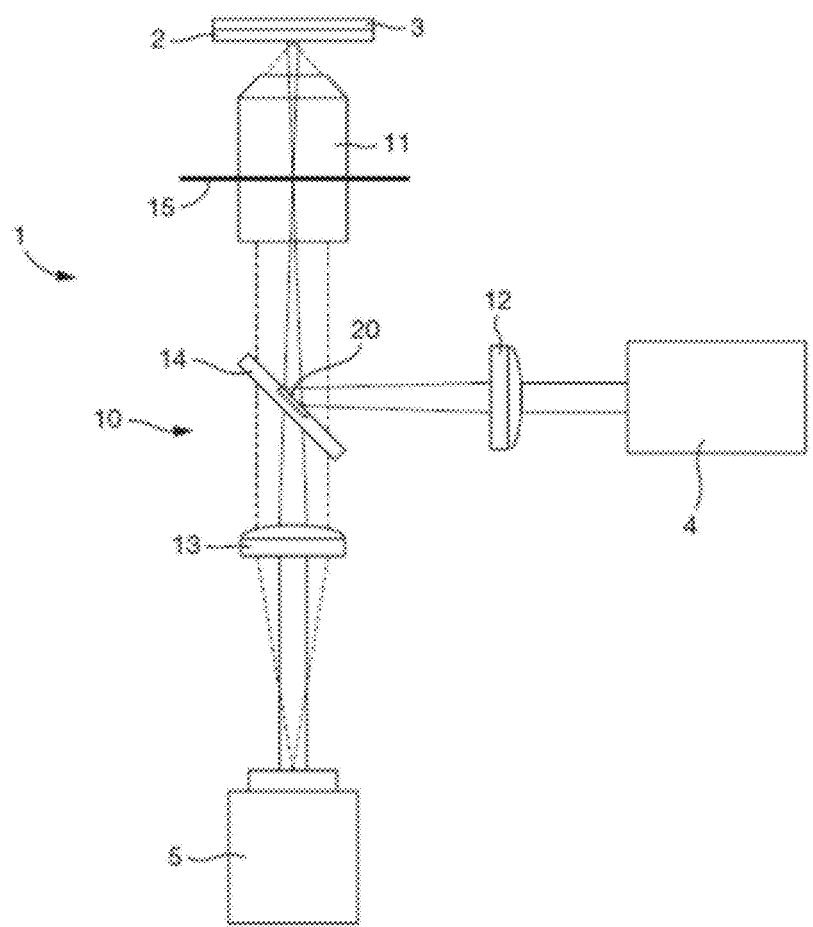
FIG. 1 illustrates an iSCAT microscope configured with a spatial filter.

The present disclosure relates to improving the resolution of iSCAT by accounting for heterogeneous reference beam characteristics. That is, the iSCAT measurements are corrected for not only heterogeneous illumination but also non-uniform reflectance.

As described previously, iSCAT measures interference contrast between a reference beam and a sample beam and correlates the measured contrast to the mass of a single molecule. Any local differences in illumination and reflectance of the sample carrier (e.g., a glass slide) will lead to local interference contrast variations that do not correlate with the mass of the particle that is scattering light at that location and will thus contribute to measurement errors. It is therefore important to carefully correct for differences in the reference signal and take into account heterogeneous illumination.

Accordingly, the systems and methods of the present disclosure enable more precise measurements of molecular weight and of concentration of multiple species in a sample.

Data Acquisition and Signal Processing iSCAT systems and methods are described in US Patent Application Publication No. 2019/0004299, Kukura et al., Nature Methods 2009 6:923-935, and Ortega-Arroyo et al., Physical Chemistry Chemical Physics 2012 14:15625-15636, each herein incorporated by reference. The present disclosure expands the signal processing in such systems and methods to correct for heterogeneous sample illumination.

iSCAT comprises determining interference between light scattered by an object in a sample and light reflected from the sample location. The interference is dependent on the scattering amplitude of the object (and in turn its volume and refractive index) and is measured as an iSCAT signal. Thus, the iSCAT signal generated by a particle (for example, a biological molecule such as a protein) may be correlated with its volume and diameter to identify the type of particle present in the sample. On calibration, the iSCAT signal may also be used to estimate mass/concentration of particles, as described below. Thus, the systems and methods described herein typically comprise measuring an iSCAT signal. The iSCAT signal may be described as the ratio of detected light in the presence and absence of a particle. In more detail, it may be defined as $(I_s - I_p)/I_s$, where $I_s$ is the reflected intensity from a sample location (such as a glass surface) in the absence of a particle, and $I_p$ the same measure in the presence of a particle.

The iSCAT signal may be an amplitude image of the light collected from a sample area including reflected and scatter components. From the amplitude image, an interference contrast plot (number of particles versus contrast) may be derived by application of, for example, background correction, PSF filtering, particle counting, and contrast determination. Contrast in the interference contrast plot may be converted to mass by appropriate calibration.

The method may comprise use of an interferometric scattering microscope comprising: a sample holder for holding a sample in a sample location; an illumination source arranged to provide illuminating light; a detector; and an optical system being arranged to direct illuminating light onto the sample location and being arranged to collect output light in reflection, the output light comprising both light scattered from the sample location, and illuminating light reflected from the sample location, and direct the output light to the detector. The microscope may further comprise a spatial filter positioned to filter the output light, the spatial filter being arranged to pass output light but with a reduction in intensity that is greater within a predetermined numerical aperture than at larger numerical apertures. Such a spatial filter advantageously reduces the intensity of the reference beam without affecting the light scattered from the sample, as described in PCT/GB2017/052070 and Cole et al., ACS Photonics, 2017, 4(2):211-216, each incorporated by reference herein.

The light used may be: ultraviolet light (which may be defined herein as having wavelengths in the range from 10 nm to 380 nm); visible light (which may be defined herein as having wavelengths in the range from 380 nm to 740 nm); infrared light (which may be defined herein as having wavelengths in the range from 740 nm to 300 μm). The light is preferably visible light. Blue light is preferred for high sensitivity of detection of particles such as biopolymers. Red light may also be advantageously used to allow for combining detection of particles by iSCAT with detection of specific molecular components (for example a specific protein of interest) by fluorescence, for example using a fluorescently labelled antibody binding the protein of interest. The light may be a mixture of wavelengths. The illuminating light may be coherent light, provided for example by a laser. The scattering signal is polarization-dependent. Accordingly, differently polarized light may be used, for example, to analyze samples with different molecular structures.

FIG. 1 illustrates an iSCAT microscope 1 configured with a spatial filter. The spatial filter is advantageous for the reasons discussed, to improve contrast, but the systems and methods described herein may alternatively employ an iSCAT microscope without a spatial filter.

The microscope 1 includes the following components that, except for the spatial filter described in more detail below, have a construction that is conventional in the field of microscopy.

The microscope 1 comprises a sample holder 2 for holding a sample 3 at a sample location. The sample 3 may be a liquid sample comprising objects to be measured, which are described in more detail below. The sample holder 2 may take any form suitable for holding the sample 3. Typically, the sample holder 2 holds the sample 3 on a surface, which forms an interface between the sample holder 2 and the sample 3. For example, the sample holder 2 may be a coverslip and/or may be made from glass. The sample 3 may be provided on the sample holder 2 in a straightforward manner, for example using a micropipette.

The microscope 1 further comprises an illumination source 4 and a detector 5. The illumination source 4 is arranged to provide illuminating light. The illuminating light may be coherent light. For example, the illumination source 4 may be a laser. The wavelength of the illuminating light may be selected in dependence on the nature of the sample 3 and/or the properties to be examined. In one example, the illuminating light has a wavelength of 525 nm.

Optionally, the illumination light may be modulated spatially, to remove speckle patterns that arise from the coherent nature of the illumination and laser noise, for example as detailed in Kukura et al., "High-speed nanoscopic tracking of the position and orientation of a single virus", Nature Methods 2009 6:923-935. The detector 5 receives output light in reflection from the sample location. Typically, the microscope 1 may operate in a wide-field mode, in which case the detector 5 may be an image sensor that captures an image of the sample 3. The microscope 1 may alternatively operate in a confocal mode, in which case the detector 5 may be an image sensor or may be a point-like detector, such as a photo-diode, in which case a scanning arrangement may be used to scan a region of the sample 3 to build up an image. Examples of image sensors that may be employed as the detector 5 include a CMOS (complementary metal-oxide semiconductor) image sensor or a CCD (charge-coupled device). The detector 5 may also be a pixelated area detector.

The microscope 1 further comprises an optical system 10 arranged between the sample holder 2, the illumination source 4 and the detector 5. The optical system 10 is arranged as follows to direct illuminating light onto the sample location for illuminating the sample 3, and to collect output light in reflection from the sample location and to direct the output light to the detector 5.

The optical system 10 includes an objective lens 11 which is a lens system disposed in front of the sample holder 2. The optical system 10 also includes a condenser lens 12 and a tube lens 13.

The condenser lens 12 condenses illuminating light from the light source 11 (shown by continuous lines in FIG. 1) through the objective lens 11 onto the sample 3 at the sample location.

The objective lens 11 collects the output light which comprises both (a) illuminating light reflected from the sample location (shown by continuous lines in FIG. 1), and (b) light scattered from the sample 3 at the sample location (shown by dotted lines in FIG. 1). The reflected light is predominantly reflected from the interface between the sample holder 2 and the sample 3. Typically, this is a relatively weak reflection, for example a glass-water reflection. For example, the intensity of the reflected illuminating light may be of the order of 0.5% of the intensity of the incident illuminating light. The scattered light is scattered by objects in the sample 3.

In a similar manner to conventional iSCAT, scattered light from objects at or close to the surface of the sample destructively interfere with the reflected light and so are visible in the signal captured by the detector 5. This effect differs from a microscope operating in transmission wherein the illuminating light that reaches the detector is transmitted through the depth of the sample.

As shown in FIG. 1, the reflected illuminating light and the scattered light have different directionalities. In particular, the reflected illuminating light has a numerical aperture resulting from the geometry of the beam of light output by the light source 4 and the optical system 6. The scattered light is preferentially at higher angles than the reflected illuminating light.

The tube lens 13 focuses the output light from the objective lens 11 onto the detector 5.

The optical system 6 also includes a beam splitter 14 that is arranged to split the optical paths for the illuminating light from the light source 4 and the output light directed to the detector 5. Except for the provision of a spatial filter as described below, the beam splitter 14 may have a conventional construction that provides partial reflection and partial transmission of light incident thereon. For example, the beam splitter 14 may be a plate, typically provided with a film, which may be metallic or dielectric, arranged at 45° to the optical paths. Alternatively, the beam splitter 14 may be a cube beam splitter formed by a matched pair of prisms having a partially reflective film at the interface between the prisms. Alternatively, the beam splitter 14 may be a polarizing beam splitter, used in combination with a quarter wave plate between the beam splitter 14 and the sample 3.

In the example shown in FIG. 1, the light source 4 is offset from the optical path of the objective lens 11 so that the illuminating light from the light source 4 is reflected by the beam splitter 14 into the objective lens 11, and conversely the detector 5 is aligned with the optical path of the objective lens 11 so that the output light from the sample location is transmitted through the beam splitter 14 towards the detector 5.

In addition to the components described above that may be of a conventional construction, the microscope 1 includes a spatial filter 20. The spatial filter 20 is preferentially located in the main pupil plane of the optical system. The pupil plane of an optical system may be defined as the Fourier plane of the objective. In the example shown in FIG. 1, the spatial filter 20 is formed on the beam splitter 14 and is thereby positioned in the main pupil plane of the optical system, that is, in the back focal plane 15 of the objective lens 11. Alternatively, the spatial filter 20 may be placed in the re-imaged pupil plane further down the beam path.

The spatial filter serves as a numerical aperture filter, advantageously attenuating low angle beams to reduce the intensity of the illuminating reference beam without affecting the light scattered from the sample.

The spatial filter 20 is thereby positioned to filter the output light passing to the detector 5. In the example shown in FIG. 1 in which the detector 5 is aligned with the optical path of the objective lens 11, the spatial filter 20 is therefore transmissive.

The spatial filter 20 is partially transmissive and therefore passes the output light, which includes the reflected illumination light, but with a reduction in intensity. The spatial filter 20 is also aligned with the optical axis and has a predetermined aperture so that it provides a reduction in intensity within a predetermined numerical aperture. Herein, numerical aperture is defined in its normal manner as being a dimensionless quantity characterizing a range of angles with respect to the sample location from which the output light originates.

The spatial filter 20 provides no or little intensity reduction outside the predetermined numerical aperture. In principle, the spatial filter 20 could alternatively provide a reduction in intensity outside its predetermined aperture, but a reduction in intensity that is less than the reduction in intensity within the predetermined numerical aperture, although this is less desirable.

The spatial filter 20 may be formed in any suitable manner, typically comprising a layer of deposited material. The material may be, for example, a metal such as silver. The deposition may be performed using any suitable technique.

As sub-diffraction sized objects near an interface scatter light preferentially into a larger numerical aperture than the reflected illuminating light, the reduction in intensity provided by the spatial filter 20 preferentially reduces the intensity in detection of the reflected illuminating light over the scattered light. Accordingly, the reduction in intensity by the spatial filter 20 at low numerical apertures predominantly affects the reflected illuminating light and has a minimal effect on the scattered light, thereby maximizing the signal to noise, which for images maximizes the image contrast. The enhanced signal to noise enables high contrast detection of objects that are weak scatterers.

The contrast enhancement may be understood as follows. As the spatial filter 20 passes part of the output light in the predetermined numerical aperture (i.e., is partially transmissive in this example), fractions of illuminating light and scattered light fields reach the detector and interfere. The light intensity reaching the detector $I_{det}$ is then given by $I_{det}=|E_{inc}|^2\{r^2t^2+|s|^2+2rt|s|\cos\Phi\}$, where $E_{inc}$ is the incident light field, $r^2$ is the reflectivity of the interface, and $t^2$ is the transmissivity of the spatial filter 20, s is the scattering amplitude of the object, and $\Phi$ is the phase difference between transmitted illuminating light and the scattered light. Thus, the scattering contrast is enhanced, albeit at the expense of the total number of detected photons.

Thus, contrast is provided in a similar manner to conventional iSCAT, but controlled additionally by the transmissivity of the spatial filter. This provides the ability to tune the amplitude of the reference field directly through selection of the transmissivity $t^2$ of the spatial filter 20 as opposed to being fixed by the reflectivity of a glass-water interface as in standard iSCAT. In the case that the spatial filter 20 is a layer of deposited material, the transmissivity $t^2$ may be selected by choice of the material and/or thickness of the layer. Such tuning may be performed according to, for example, the scattering object of interest, the camera full well capacity and magnification.

To maximize these beneficial effects to iSCAT, the predetermined numerical aperture may be the numerical aperture of the reflected illuminating light within the output light, but that is not essential. For example, benefits of a similar nature could be achieved if the predetermined numerical aperture was slightly smaller than, or larger than the numerical aperture of the reflected illuminating light.

The methods and systems of the present disclosure derive and apply correction factors for illumination heterogeneity and differences in the reflectance of the sample/sample holder interface. The differences in the reflectance of the sample/sample holder interface can, for example, be due to chemical impurities and surface roughness changes in the sample holder.

A method of the present disclosure can comprise: measuring a first series of iSCAT signals F(x,y) and a second series of iSCAT signals G(x,y) of a sample on a sample holder; deriving an illumination heterogeneity I(x,y) for the first series of iSCAT signals F(x,y); and deriving a reflectance profile R(x,y) based on the illumination heterogeneity I(x,y) and the second series of iSCAT signals G(x,y). The reflectance profile R(x,y) can then be applied as a correction factor to newly acquired iSCAT signals. For example, a method of the present disclosure can further comprise: measuring a third series of iSCAT signals C(x,y) of the sample on the sample holder; and normalizing an interferometric contrast for the third series of iSCAT signals C(x,y)

with the reflectance profile R(x,y) to yield normalized third series of iSCAT signals C*(x,y).

Deriving the illumination heterogeneity can comprise: calculating a median image from the first series of iSCAT signals; and blurring the median image by a kernel to produce the illumination heterogeneity, as illustrated in the following formula.

$$I(x,y)=\mathrm{Blur}[\mathrm{Median}[F(x,y)]]$$

When the first series of iSCAT signals F(x,y) is from different locations along the sample holder, the kernel should be larger than a dimension of a point spread function. When the first series of iSCAT signals F(x,y) is from a single location along the sample holder, the kernel should be larger than a dimension of a roughness feature on the sample holder.

Deriving a reflectance profile can comprise: measuring local differences in reflectance at a sample-sample holder interface for the second series of iSCAT signals G(x,y); calculating a median of the local differences in reflectance; and dividing the median of the local differences in reflectance by the illumination heterogeneity I(x,y), as illustrated in the following formula.

$$R(x,y)=\mathrm{Median}[G(x,y)]/I(x,y)$$

Normalizing the interferometric contrast can comprise: multiplying each of the second series of iSCAT signals times a square root of the reflectance profile R(x,y), as illustrated in the following formula.

$$C^*(x,y)=C(x,y)*\sqrt{R(x,y)}$$

By applying the reflectance profile R(x,y) to the newly acquired images, the signal to noise ratio is enhanced, which improves the accuracy of quantitative measurements like determining particle mass.

The correction methods described herein can be performed with a system. For example, a system can include a computer system that comprises: a processor; and a tangible, machine-readable storage medium that stores machine-readable instructions for execution by the processor, the machine-readable instructions corresponding to one or more of the methods described herein. That is, the methods described herein can be performed on computing devices (or processor-based devices) that include a processor; a memory coupled to the processor; and instructions provided to the memory, wherein the instructions are executable by the processor to perform the methods (or steps of the methods) described herein. The instructions can be a portion of code on a non-transitory computer readable medium. Any suitable processor-based device may be utilized for implementing all or a portion of embodiments of the present techniques, including without limitation personal computers, networks personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

The terms "non-transitory, computer-readable medium," "tangible machine-readable medium," or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

Example Particles

Particles that may be detected according to the methods of the disclosure may be any particle within a solution, from a single molecule, via biological macromolecules, to an oligomeric assembly. Examples of suitable particles are single molecules, proteins, polypeptides, peptides, amino acids, monosaccharides, carbohydrates, oligosaccharides, polysaccharides, glycopeptides, glycoproteins, lipids, fatty acids, waxes, sterols, fat-soluble vitamins, monoglycerides, diglycerides, triglycerides, phospholipids, glycerolipids, glycerophospholipids, sphingolipids, saccharolipids, polyketides, glycolipids, liopoproteins, nucleic acids, nucleotides, polynucleic acids, clusters of molecules, assemblies, aggregations, protein/protein interactions, protein/small molecule interactions, protein-nucleic acid interactions and/or oligomeric assemblies.

The applicant has previously noted that it is possible to use iSCAT for determination of the concentration of a particle in solution. For the determination of concentration of the particles in solution, it is not necessary to label the particle prior to detection. Since the light scattering microscopy is capable of determining the mass of the particle, it can be identified simply by mass. Determining the concentration generally relies upon the determination of the binding of a particle to a surface.

Mass Determination

As mentioned above, the interferometric light scattering microscopy discussed herein is capable of quantifying the mass of an object, for example the mass of a single protein. Various aspects of methods for quantifying the mass of an object by interferometric light scattering microscopy are described in US Patent Publication No. 2019/004299, the content of which is incorporated herein by reference.

Accordingly, it is a further aspect of the present invention that improving the resolution of iSCAT by accounting for heterogeneous reference beam characteristics (that is, for heterogeneous illumination and non-uniform reflectance profiles) advantageously enables a more reliable determination of the mass of an object mass via interferometric light scattering microscopy.

Example Particles in Solution

The solution can be any solution of the particle in a liquid solvent. The solution can be simple, for example the particle dispersed in water (an aqueous solution of the particle) or it can be a complex solution, for example the particle plus one or more other solutes. The solution may be a sample. Samples may be taken from commercially prepared solutions in order to test for concentration. Bodily fluids are examples of complex solutions where numerous solutes are present, including electrolytes, sugar and urea. The sample may be taken from any source, including biological or environmental samples. If the sample is a biological sample, it may be taken or obtained from a human or animal body or individual, for example blood, serum, plasma, urine, saliva, lymph, sweat, amniotic fluid, cerebrospinal fluid, breast milk, tears, secretions, synovial fluid, semen, bile, or mucus. If the sample is an environmental sample, it may be taken from any source, such as water (for example wells, streams, rivers, lakes, rainwater, seawater and the like), food and drinks (for example beverages), agricultural samples or liquid samples from factories and manufacturing processes.

It is not necessary to prepare the solution or sample prior to contacting with the surface of the sample holder, but if the solution is thought to be concentrated, the solution may be contacted with a measuring solution.

Sample Holder

The surface of the sample holder used for binding the particle is preferably a detector surface and may form part of a sample holder for a light scattering microscope. The surface is preferably glass, sapphire or made from transparent polymers. The sample is brought into contact with the surface in order to determine the mass of the particle and/or the concentration of the particle in solution. The sample may be placed into a sample holder, which includes the surface. As previously described, the microscope comprises a sample holder for holding a sample at a sample location. The sample may be a liquid sample comprising particles to be measured. The sample holder may take any form suitable for holding the sample. Typically, the sample holder holds the sample on a surface, which forms an interface between the sample holder and the sample. For example, the sample holder may be a coverslip and/or may be made from glass. The sample may be provided on the sample holder in a straightforward manner, for example using a micropipette or an automated dispensing system.

The sample holder may take any appropriate format. In some formats, the sample holder will allow for a high surface area to volume ratio, such that access to the surface does not limit the binding of the particle in the solution. In other formats, the ratio between the surface area and the volume may decrease, such that there is a low surface area to volume ratio, which may limit access of the particles to the surface. It will be clear to those skilled in the art that the selection of surface area to volume of the sample holder will alter the way in which concentration may be measured. If the sample holder has a low surface area to volume ratio, for example, the binding rate of the particle will not decrease over time. In this situation, the binding rate at any moment as detected using light scattering can be used to calculate the concentration.

The surface used in the disclosure may be any suitable surface. For example, the surface may be a passivated surface. Passivation is the process of treating or coating a surface in order to enhance or reduce the chemical reactivity, thus increasing or decreasing the number of binding events.

Alternatively, the surface may be an activated, coated, derivatized or treated surface. The surface may be derivatized by immobilizing an entity to the surface, such as a silane. In an example the surface is coated with APTES, which allows for salinization, which is the functionalization of the surfaces with alkoxysilane molecules. This is advantageous for some particles as it leads to a positively charged surface. The coating process with APTES leads to the formation of a covalent bond between the surface and the silane. The protonated amine groups align themselves in the free space and make positive docking sites for the any negatively charged groups (such as sialic acids, carboxyl, and sulphate ester groups) of the particle.

The surface may be coated with a specific binding entity or partner for the particle. Such a surface enables the selection of the particle from concentrated or complex mixtures. The calculation of concentration in this scenario requires the binding constant for the particle and the specific binding entity to be known.

It is important that if the surface is modified that these modifications do not cause any alterations in the ability of the binding of the particle to be detected by light scattering.

Binding Rates

The solution may be contacted with the surface in order to determine the mass of a particle and/or the concentration of a particle in said solution. The particle may bind to the surface, and this binding to the surface is visualized or detected using light scattering, preferably iSCAT, and preferably with a microscope.

The binding of the particle to the surface may be non-specific, or alternatively, the binding may be specific, dependent on the nature of the surface used, as discussed above. Should the surface be glass (i.e. a glass coverslip) the binding will be non-specific. Should the surface be treated, the binding may be specific. The rate of binding to the surface may be calculated by repeating the detection step one or more times, or may be taken from a single measurement.

The binding and/or number of particles bound to the surface may be detected using light scattering. This may then be repeated one or more times to determine changes in the binding rate and/or the initial binding rate of the particle to the surface. The binding at each time point may be plotted to establish the binding rate.

In instances where the ratio of the surface area to volume of the solution is low, the binding rate may be constant. Therefore, if it is desired to determine concentration, one measurement may be sufficient, since the binding rate at any given time is representative of the number of particles. In some instances, it may be desirable to repeat the detection of bound particles in order to determine whether the binding rate is constant or whether it has changed over time. Where there are no changes to the binding rate (constant rate), the binding rate recorded at any point is considered representative of the absolute concentration. Where there are changes to the binding rate, these changes can be plotted and the data extrapolated to a zero time point in order to calculate the concentration.

From a constant binding rate or in case of changes in binding rates from the initial binding rate, the decay or decline in the rate of binding of the particle to the surface can be calculated. The decline in the binding rate can be correlated to the concentration of the particle in the solution. For example, the binding of a particle to the surface (as visualized by iSCAT) decreases over time as a function of the remaining number of particles in solution and accessible sites for binding.

The detection of the binding of the particle to the surface may be repeated over time, and the intervals between measurements will depend upon the nature of the particle and solution, which requires measurement, and will vary from solution to solution.

Exemplarily, measurements can be taken effectively immediately after the sample has been contacted with the surface, for example within a second or fraction thereof of the contact, and then measurements can be taken every few seconds thereafter, for example with an interval between measurements of 1-60, 1-30, 1-5, 5-10, 10-15, 15-20, 20-25, 25-30, 30-35, 35-40, 45-50, 55-60 seconds after contact.

Measurements may be repeated for as long as required in order to determine initial binding rate.

It will be appreciated that the interval between measurements may relate to the particle under investigation, and therefore could be longer, i.e. the time between measurements could be minutes to hours. Therefore, the measurements can be taken every few minutes after the initial measurement, for example with an interval between measurements of 1-60, 1-30, 1-5, 5-10, 10-15, 15-20, 20-25, 25-30, 30-35, 35-40, 45-50, 55-60 minutes after contact. Alternatively or additionally, the measurements can be taken every few hours after the initial measurement, for example with an interval between measurements of 1-24, 1-12, 1-6, 1-5, 1-4, 1-3, 1-2 hours or 1 hour after contact. Longer intervals are considered to provide further evidence that there is no dissociation within the few minutes of the actual measurement, as it would be possible to show that it takes much longer to occur.

Additionally, the time intervals can be varied within one assay. For example, the first few measurements can be taken every few seconds, and further measurements can be taken with a longer time interval of minutes. So long as the time of detection is recorded, the interval can be varied.

It is preferred that binding is detected at least once subsequent to the initial detection. Preferably, binding of the particle to the surface is detected twice or more, even more preferably three times, four times, five times, six times, seven time, eight times, nine times or more. Each independent detection event of the binding of the particle to the surface is separated by a time interval as discussed previously which can be the same time interval between each detection event, or vary.

According to the present invention there is provided a method comprising the steps of:
(1) measuring a first series of interferometric scattering microscopy (iSCAT) signals and a second series of iSCAT signals of a sample on a sample holder, the sample comprising a particle dissolved in solution;
(2) deriving an illumination heterogeneity for the first series of iSCAT signals;
(3) deriving a reflectance profile for the first series of iSCAT signals based on the illumination heterogeneity and/or the second series of iSCAT signals;
(4) measuring a third series of iSCAT signals of the sample on the sample holder; and
(5) normalizing an interferometric contrast for the third series of iSCAT signals with the reflectance profile.

The first series of iSCAT signals may be from different locations along the sample holder, and the derivation of the illumination heterogeneity may comprise: calculating a median image from the first series of iSCAT signals; and blurring the median image by a kernel larger than a dimension of a point spread function to produce the illumination heterogeneity.

The first series of iSCAT signals may be from a single location along the sample holder, and the derivation of the illumination heterogeneity may comprise: calculating a median image from the first series of iSCAT signals; and blurring the median image by a kernel larger than a dimension of a roughness feature on the sample holder to produce the illumination heterogeneity.

The derivation of a reflectance profile may comprise: measuring local differences in reflectance at a sample-sample holder interface; calculating a median of the local differences in reflectance; and dividing the median of the local differences in reflectance by the illumination heterogeneity.

The normalization of the interferometric contrast may comprise: multiplying each of the third series of iSCAT signals times a square root of the reflectance profile.

The method or machine-readable instructions may further comprise the step of quantifying the mass of the particle, wherein quantifying the mass of said particle is based on the normalized third series of iSCAT signals.

Furthermore, according to the present invention there is a provided a system comprising: a processor; a non-transitory machine readable medium that stores machine-readable instructions for execution by the processor, the machine-readable instructions comprising:
(1) measure a first series of interferometric scattering microscopy (iSCAT) signals and a second series of iSCAT signals of a sample on a sample holder, the sample comprising a particle dissolved in solution;
(2) derive an illumination heterogeneity for the first series of iSCAT signals;
(3) derive a reflectance profile for the first series of iSCAT signals based on the illumination heterogeneity and the second series of iSCAT signals;
(4) measure a third series of iSCAT signals of the sample on the sample holder;
(5) normalize an interferometric contrast for the third series of iSCAT signals with the reflectance profile.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Samples were prepared by dissolving heat shock protein (HSP) 16.5, HSP 27, or dynamin in Phosphate Buffered Saline (PBS). A glass cover slip, the surface of which was cleaned by a series of washes in the order of: ethanol, water, isopropanol, water, ethanol; was used as a sample holder. iSCAT signals were collected for each sample. An illuminating light source of wavelength 525 nm was used. The iSCAT signals were then corrected for reflectance alone by known methods and corrected for reflectance and illumination heterogeneity as described above relative to I(x,y) and R(x,y).

Figure 2:
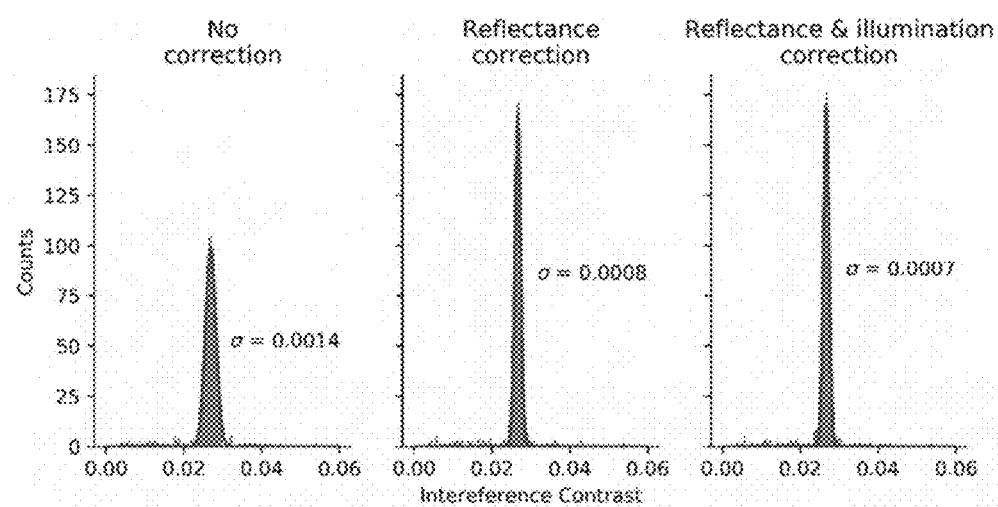
FIG. 2 illustrates an iSCAT signal for heat shock protein (HSP) 16.5 in water with no correction (left panel), with only a reflectance correction (middle panel), and with a reflectance and illumination correction (right panel).

FIG. 2 illustrates an iSCAT signal for HSP 16.5 in PBS with no correction (left panel), with only a reflectance correction (middle panel), and with a reflectance and illumination correct (right panel).

Figure 3:
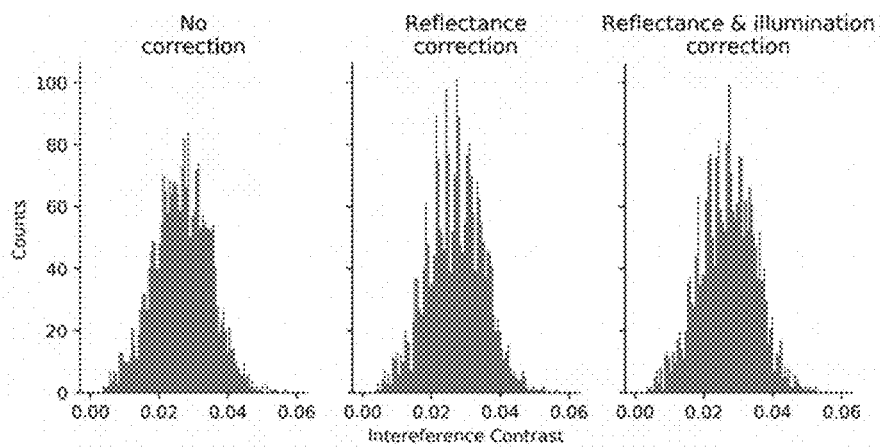
FIG. 3 illustrates an iSCAT signal for HSP 27 in water with no correction (left panel), with only a reflectance correction (middle panel), and with a reflectance and illumination correction (right panel).

FIG. 3 illustrates an iSCAT signal for HSP 27 in PBS with no correction (left panel), with only a reflectance correction (middle panel), and with a reflectance and illumination correct (right panel).

Figure 4:
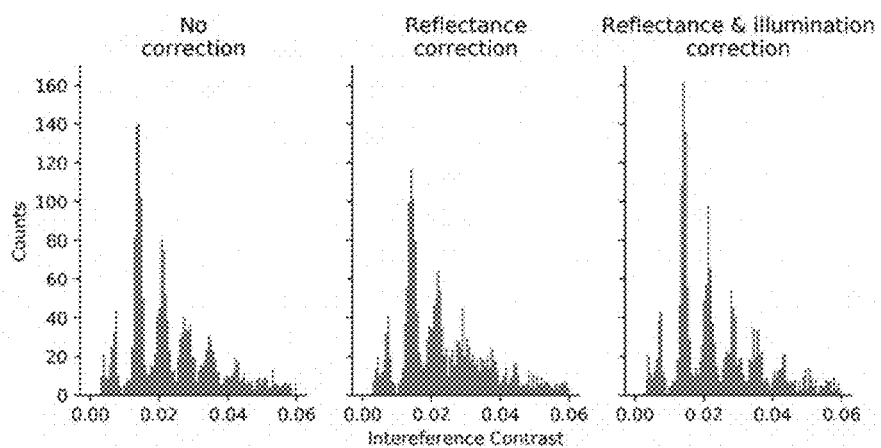
FIG. 4 illustrates an iSCAT signal for dynamin in water with no correction (left panel), with only a reflectance correction (middle panel), and with a reflectance and illumination correction (right panel).

FIG. 4 illustrates an iSCAT signal for dynamin in PBS with no correction (left panel), with only a reflectance correction (middle panel), and with a reflectance and illumination correct (right panel).

In each sample, the peaks in the interference signal contrast is sharpens with correction, where the best sharpening is with the correction for reflectance and illumination heterogeneity as described herein. This is quantified by full width at half max ($\sigma$) value for the HSP 16.5 sample. Because HSP 16.5 is a protein of a single molecular weight, the signal should be a single sharp peak. With no correction, $\sigma$ is 0.0014. With only a reflectance correction, $\sigma$ is 0.0008. With correction for reflectance and illumination heterogeneity as described herein, $\sigma$ is further reduced to 0.0007. Accordingly, the correction methods described herein are useful for producing more accurate iSCAT data and more accurate measurements (e.g., mass determination) derived therefrom.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    measuring a first series of interferometric scattering microscopy (iSCAT) signals and a second series of iSCAT signals of a sample on a sample holder, the sample comprising a particle dissolved in solution;
    deriving an illumination heterogeneity for the first series of iSCAT signals;
    deriving a reflectance profile for the first series of iSCAT signals based on the illumination heterogeneity and/or the second series of iSCAT signals;
    measuring a third series of iSCAT signals of the sample on the sample holder;
    normalizing an interferometric contrast for the third series of iSCAT signals with the reflectance profile.

2. The method of claim 1, wherein the first series of iSCAT signals is from different locations along the sample holder, wherein deriving the illumination heterogeneity comprises:
    calculating a median image from the first series of iSCAT signals; and
    blurring the median image by a kernel larger than a dimension of a point spread function to produce the illumination heterogeneity.

3. The method of claim 1, wherein the first series of iSCAT signals is from a single location along the sample holder, wherein deriving the illumination heterogeneity comprises:
    calculating a median image from the first series of iSCAT signals; and
    blurring the median image by a kernel larger than a dimension of a roughness feature on the sample holder to produce the illumination heterogeneity.

4. The method of claim 1, wherein deriving a reflectance profile comprises:
    measuring local differences in reflectance at a sample-sample holder interface;
    calculating a median of the local differences in reflectance; and
    dividing the median of the local differences in reflectance by the illumination heterogeneity.

5. The method of claim 1, wherein normalizing the interferometric contrast comprises:
    multiplying each of the third series of iSCAT signals times a square root of the reflectance profile.

6. The method of claim 1, further comprising:
    quantifying the mass of the particle, wherein quantifying the mass of said particle is based on the normalized third series of iSCAT signals.

7. A system comprising:
    a processor;
    a non-transitory machine readable medium that stores machine-readable instructions for execution by the processor, the machine-readable instructions comprising:
        measure a first series of interferometric scattering microscopy (iSCAT) signals and a second series of iSCAT signals of a sample on a sample holder, the sample comprising a particle dissolved in solution;
        derive an illumination heterogeneity for the first series of iSCAT signals;
        derive a reflectance profile for the first series of iSCAT signals based on the illumination heterogeneity and the second series of iSCAT signals;

measure a third series of iSCAT signals of the sample on the sample holder;

normalize an interferometric contrast for the third series of iSCAT signals with the reflectance profile.

8. The system of claim 7, wherein the first series of iSCAT signals is from different locations along the sample holder, wherein the step of derive the illumination heterogeneity comprises:

calculate a median image from the first series of iSCAT signals; and blur the median image by a kernel larger than a dimension of a point spread function to produce the illumination heterogeneity.

9. The system of claim 8, wherein the first series of iSCAT signals is from a single location along the sample holder, wherein the step of derive the illumination heterogeneity comprises:

calculate a median image from the first series of iSCAT signals; and blur the median image by a kernel larger than a dimension of a roughness feature on the sample holder to produce the illumination heterogeneity.

10. The system of claim 8, wherein the step of derive the reflectance profile comprises:

measure local differences in reflectance at a sample-sample holder interface;

calculate a median of the local differences in reflectance; and divide the median of the local differences in reflectance by the illumination heterogeneity.

11. The system of claim 8, wherein normalizing the interferometric contrast comprises:

multiplying each of the third series of iSCAT signals times a square root of the reflectance profile.

12. The system of claim 8, wherein the machine-readable instructions further comprise:

quantifying the mass of the particle, wherein quantifying the mass of said particle is based on the normalized third series of iSCAT signals.

* * * * *

UNITED STATES PATENT AND TRADEMARK OFFICE
CERTIFICATE OF CORRECTION

Page 1 of 1

PATENT NO. : 10,816,784 B1
APPLICATION NO. : 16/446089
DATED : October 27, 2020
INVENTOR(S) : Max Hantke and Gavin Young It is certified that error appears in the above-identified patent and that said Letters Patent is hereby corrected as shown below:

On the Title Page

Insert Applicants:
--Refeyn Limited Oxford, GB
Oxford University Innovation Limited Oxford, GB--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*